United States Patent
Dorsett et al.

(10) Patent No.: US 11,264,887 B2
(45) Date of Patent: Mar. 1, 2022

(54) MULTI-PULSE TRANSFORMER FOR USE WITH AN INDUSTRIAL MACHINE

(71) Applicant: JOY GLOBAL SURFACE MINING INC, Milwaukee, WI (US)

(72) Inventors: William A. Dorsett, Longview, TX (US); David T. Huber, Longview, TX (US); Jason L. Esser, Hallsville, TX (US)

(73) Assignee: JOY GLOBAL SURFACE MINING INC, Milwaukee, WI (US)

( * ) Notice: Subject to any disclaimer, the term of this patent is extended or adjusted under 35 U.S.C. 154(b) by 593 days.

(21) Appl. No.: 15/141,242

(22) Filed: Apr. 28, 2016

(65) Prior Publication Data

US 2016/0322891 A1    Nov. 3, 2016

Related U.S. Application Data

(60) Provisional application No. 62/153,747, filed on Apr. 28, 2015.

(51) Int. Cl.
*H02M 1/12* (2006.01)
*H02M 7/08* (2006.01)
(Continued)

(52) U.S. Cl.
CPC ............. *H02M 1/12* (2013.01); *H01F 27/28* (2013.01); *H02M 7/08* (2013.01); *E02F 3/308* (2013.01); *E02F 9/2095* (2013.01)

(58) Field of Classification Search
CPC . H02M 1/12; H02M 7/08; H01F 27/28; E02F 9/2095
(Continued)

(56) References Cited

U.S. PATENT DOCUMENTS 3,271,716 A    9/1966 Furth
3,688,180 A *  8/1972 Chiasson ................. B23K 9/06
                                              363/91

(Continued)

FOREIGN PATENT DOCUMENTS

CN    102165678 A    8/2011
CN    202026245 U    11/2011
(Continued)

OTHER PUBLICATIONS

Novel 24-Pulse Rectifier Topology Based on Single 3-Phase to four 3-Phase transformation using conventional transformers for phase shifting Author: Arvindan, Guha Date: Dec. 15-17, 2010 (Year: 2010).*

(Continued)

*Primary Examiner* — Hal Kaplan
*Assistant Examiner* — Swarna N Chowdhuri
(74) *Attorney, Agent, or Firm* — Michael Best & Friedrich LLP

(57) ABSTRACT

A multi-pulse transformer for an industrial machine, the multi-pulse transformer including a primary winding and a plurality of secondary windings. The primary winding coupled to a power source, the power source operable to generate a primary voltage. The secondary windings are coupled to one or more converters, each of the secondary windings are phase shifted with respect to the primary winding. The converters are operable to provide a secondary voltage to at least one component of the industrial machine. Wherein the multi-pulse transformer converts the primary voltage to the secondary voltage and attenuates harmonic distortions caused by the converters and the component of the industrial machine. Additionally, the secondary voltage is at a voltage less than the primary voltage.

20 Claims, 8 Drawing Sheets

(51) Int. Cl.
*H01F 27/28* (2006.01)
*E02F 9/20* (2006.01)
*E02F 3/30* (2006.01)

(58) Field of Classification Search
USPC .......................................... 307/104, 108, 9.1
See application file for complete search history.

(56) References Cited

U.S. PATENT DOCUMENTS

| | | | | |
|---|---|---|---|---|
| 4,866,591 | A * | 9/1989 | Cook | H02J 1/102 363/67 |
| 5,499,176 | A | 3/1996 | Erisman | |
| 5,781,428 | A * | 7/1998 | Paice | H01F 30/12 363/126 |
| 6,404,653 | B1 | 6/2002 | Chitsazan et al. | |
| 7,830,681 | B2 | 11/2010 | Abolhassani et al. | |
| 8,243,481 | B2 * | 8/2012 | Wei | H02M 7/08 363/69 |
| 9,130,461 | B2 * | 9/2015 | Alexander | H02M 7/4807 |
| 2008/0103632 | A1 * | 5/2008 | Saban | H02K 21/48 700/286 |
| 2008/0165553 | A1 * | 7/2008 | Swamy | H02M 7/08 363/67 |
| 2012/0191439 | A1 * | 7/2012 | Meagher | G06F 30/20 703/18 |
| 2014/0110380 | A1 * | 4/2014 | Kamath | B23K 10/00 219/121.39 |
| 2014/0111091 | A1 * | 4/2014 | Grajcar | H05B 45/20 315/122 |
| 2014/0313800 | A1 * | 10/2014 | Swamy | H02M 7/08 363/126 |
| 2014/0346868 | A1 * | 11/2014 | Kuznetsov | H02J 1/00 307/18 |
| 2015/0288271 | A1 * | 10/2015 | Kuznetsov | H02P 25/22 322/63 |
| 2016/0028240 | A1 * | 1/2016 | Boys | H01F 38/14 307/104 |
| 2016/0126869 | A1 * | 5/2016 | Simms | H02J 3/18 318/376 |
| 2016/0218534 | A1 * | 7/2016 | Islinger | H02J 7/025 |
| 2016/0248363 | A1 * | 8/2016 | Wu | H02P 27/047 |
| 2016/0322891 | A1 | 11/2016 | Dorsett et al. | |
| 2016/0336928 | A1 * | 11/2016 | Kuznetsov | H02J 3/30 |

FOREIGN PATENT DOCUMENTS

| | | |
|---|---|---|
| CN | 102761085 A | 10/2012 |
| WO | 2009124319 | 10/2009 |

OTHER PUBLICATIONS

Cost Effective Multi-Pulse Transformer Solutions For Harmonic Mitigation in AC Drives Author: Skibinski, Guskov, Zhou Date: 2003 (Year: 2003).*
Chilean Patent Office Action for Application No. 201601017 dated Feb. 14, 2018 (7 pages including Statement of Relevance).
Examination Report issued by the Chilean Patent Office for Application No. 201601017 dated Oct. 16, 2017 (6 pages Statement of Relevance Included).
Chinese Patent Office Action for Application No. 201610274708.5 dated Jun. 28, 2019 (9 pages including statement of relevance).
Chilean Patent Office Action for related Application No. 2016-001017 dated Oct. 2, 2019 (3 pages including statement of relevance).
Second Office Action issued by the China National Intellectual Property Administration for Application No. 201610274708.5 dated Apr. 2, 2020 (7 pages including statement of relevance).
Examination Report No. 2 issued by the Australian Government for Application No. 2016202657 dated Aug. 19, 2020 (3 pages).
Examination Report No. 1 issued by the Australian Government for Application No. 2016202657 dated May 26, 2020 (4 pages).
Office Action issued by the Chinese Patent Office for Application No. 201610274708.5 dated Jun. 29, 2020 (8 pages including statement of relevance).

* cited by examiner

MULTI-PULSE TRANSFORMER FOR USE WITH AN INDUSTRIAL MACHINE

RELATED APPLICATION

The present application claims priority to U.S. Provisional Application No. 62/153,747, filed Apr. 28, 2015, the entire contents of which are hereby incorporated.

BACKGROUND

The present invention relates to an industrial machine.

SUMMARY

Industrial machines, such as electric rope or power shovels, draglines, etc., are used to execute digging operations to remove material from, for example, a bank of a mine. Multiple industrial machines can operate at a mine site, and multiple industrial machines can receive power from a power supply system at the mine site.

The power supply system typically provides a primary voltage to the industrial machine, which is converted to a secondary voltage by a transformer of the industrial machine. The secondary voltage is provided to a DC bus which distributes the secondary voltage to one or more components (e.g., motors, electric drives, controllers, blowers, sensors, lights, etc.) of the industrial machine. Harmonic distortions are caused in the power supply system by the non-linear loads of components (e.g. power switching devices controlled by an electric drive) of an industrial machine.

FIG. 1A illustrates a conventional power supply system 100. The conventional power supply system 100 includes a power source 110 (e.g., a utility power source), a mine network 120, a mine transformer 130, a trail cable 140, and a conventional power system 150 of at least one industrial machine. The conventional power system 150 (illustrated in more detail in FIG. 1B) includes components that may be located inside the industrial machine, such as a conventional shovel transformer 160, line filters 170, voltage spike filters 180, and converters 190.

The power source 110 generates power to be supplied or provided to the industrial machine. The power source 110 may be a utility substation at the mine site. The mine network 120 supplies the power generated by the power source 110 to one or more industrial machines. The mine transformer 130 adjusts the voltage of the power generated by the power source 110 for transmission over the trail cable 140. The trail cable 140 connects the mine transformer 130 to the industrial machine in order to deliver the power generated by the power source 110.

As illustrated in FIG. 1A, the power supply system 100 may include a Point of Common Coupling (PCC) 125. The PCC 125 is a point in the power supply system 100 where multiple loads (i.e., multiple industrial machines) may be connected to the power source 110 and mine network 120. A conventional power system 150 of the industrial machine may include line filters 170 (e.g., LCL [inductor-capacitor-inductor] filters) and the voltage spike filters 180 (e.g., dV/dt filters). The line filters 170 and voltage spike filters 180 are configured to reduce the amount of harmonic distortion caused by the PCC 125.

FIG. 1B illustrates the conventional power system 150 of the industrial machine. As illustrated in FIG. 1B, the conventional power system 150 includes conventional shovel transformer 160 having a primary winding 162 and a secondary winding 163. Voltage is received from the trail cable 140 at the primary winding 162. The conventional shovel transformer 160 is configured to efficiently modify or change AC voltage from one voltage level to another voltage level within the industrial machine. The conventional shovel transformer 160 is electrically connected to the converters 190 via line filters 170 and voltage spike filters 180.

The converters 190 deliver power to a DC bus (not shown), which distributes the converted secondary-voltage to one or more components (e.g., motors, electric drives, controllers, blowers, sensors, lights, etc.) of the industrial machine. The converters 190 can be a bridge converter (e.g., a IGBT (insulated-gate bipolar transistor) bridge converter) operable to convert an AC voltage to a DC voltage. The components of the industrial machine may each require variable amounts of power during various times of operation. Harmonic distortions may be caused in the power supply system 150 by non-linear loads of components (e.g. power switching devices controlled by an electric drive) of the industrial machine. Higher order (e.g., second-order, third-order, etc.) harmonic distortions occur at an interval multiple of the fundamental frequency of the power supply (e.g., approximately 50 Hz to approximately 60 Hz). A Total Harmonic Distortion (THD) is a measurement of the harmonic distortions and can be calculated as a ratio of the sum of the power of all higher order harmonic distortions to the power provided at the fundamental frequency (e.g., approximately 50 Hz to approximately 60 Hz), usually expressed as a percentage. The line filters 170 and the voltage spike filters 180 are provided in the conventional power system 150 in order to reduce the THD at the PCC.

The converters 190, voltage spike filters 180, and line filters 170 may be contained within the same enclosure, and may be collectively referred to as an Active Front End (AFE) system. A plurality of line filters 170 and voltage spike filters 180 are used to reduce harmonic distortions caused by the operation of the converters 190. For example, as illustrated in FIG. 1B, five line filters 170 and ten voltage spike filters 180 may be used with the converters 190. The line filters 170 and the voltage spike filters 180 are large and therefore take up space within the AFE system of the industrial machine 200. Additionally, the line filters 170 and the voltage spike filters 180 can be costly and reduce the efficiency of the conventional power system 150.

The invention described herein relates to a multi-pulse transformer that converts a primary voltage (i.e., a first voltage) to a secondary voltage (i.e., a second voltage). Additionally, the multi-pulse transformer attenuates (i.e., reduces) or cancels harmonic distortions, thereby reducing a Total Harmonic Distortion (THD) of the power supply system. In some embodiments, no additional components may be needed to attenuate harmonic distortions. As such, the invention can reduce the size and inefficiency of power systems of an industrial machine.

Additionally, the invention described herein relates to systems and methods associated with delivering electrical power to an industrial machine using a multi-pulse transformer. The multi-pulse transformer includes a primary winding and a plurality of secondary windings. The multi-pulse transformer converts a primary voltage received at the primary winding to a secondary voltage at the plurality of secondary windings, and delivers the secondary voltage to a plurality of converters (e.g., an IGBT (insulated-gate bipolar transistor) bridge in an active front end (AFE) system). The converters deliver power to a DC bus which distributes power to components (e.g., electric drives, etc.) of the industrial machine. The plurality of secondary windings attenuate harmonic distortions caused by the converters and components of the industrial machine. Reduction of the harmonic distortions is based on the plurality of secondary windings being phase shifted with respect to the primary winding of the multi-pulse transformer. No additional components are needed to attenuate or cancel harmonic distortions. For example, industrial machines typically use line filters and voltage spike filters between a conventional shovel transformer and the converter to attenuate harmonic distortions. A system using the multi-pulse transformer of the invention described herein does not use additional components, such as line filters, and therefore can be smaller in size and more efficient in delivering power.

In one embodiment, the invention provides a multi-pulse transformer for an industrial machine, the multi-pulse transformer including a primary winding and a plurality of secondary windings. The primary winding coupled to a power source, the power source operable to generate a primary voltage. The secondary windings are coupled to one or more converters, each of the secondary windings are phase shifted with respect to the primary winding. The converters are operable to provide a secondary voltage to at least one component of the industrial machine. Wherein the multi-pulse transformer converts the primary voltage to the secondary voltage and attenuates harmonic distortions caused by the converters and the component of the industrial machine. Additionally, the secondary voltage is at a voltage less than the primary voltage.

In another embodiment, the invention provides a power system of an industrial machine, the power system including one or more converters and a multi-pulse transformer. The converters are operable to deliver a secondary voltage to at least one component of the industrial machine. The multi-pulse transformer includes a primary winding and a plurality of secondary windings. Each of the secondary windings are phase shifted with respect to the primary winding. The multi-pulse transformer is configured to receive a primary voltage at the primary winding, convert the primary voltage to the secondary voltage, provide the secondary voltage to the converters, and attenuate harmonic distortions caused by the converters and the component of the industrial machine. Wherein the secondary voltage is at a voltage less than the primary voltage.

In yet another embodiment, the invention provides a method for delivering power to a component of an industrial machine. The method including receiving, at a primary winding of a multi-pulse transformer, a primary voltage; converting the primary voltage to a secondary voltage; delivering, at a plurality of secondary windings of the multi-pulse transformer, the secondary voltage to the component; and attenuating, at the plurality of secondary windings, harmonic distortions caused by one or more converters and the component of the industrial machine. Wherein each of the secondary windings are phase shifted with respect to the primary winding, and the secondary voltage is at a voltage less than the primary voltage.

Other aspects of the invention will become apparent by consideration of the detailed description and accompanying drawings.

DETAILED DESCRIPTION

Figure 1A:
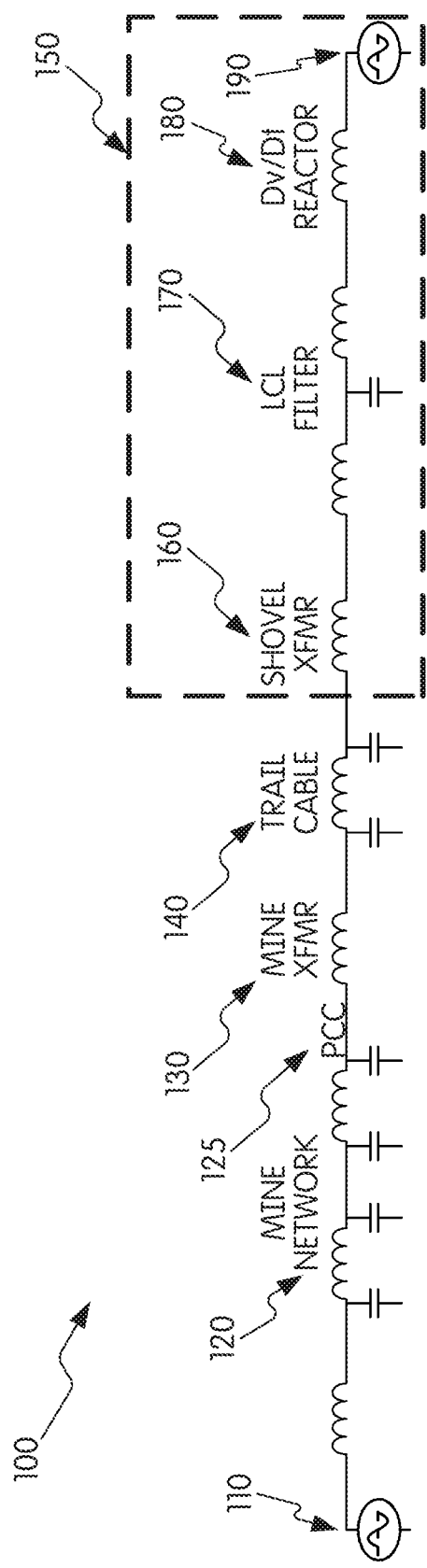
FIG. 1A is a single line diagram of a conventional power supply system for a mine site.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Figure 2:
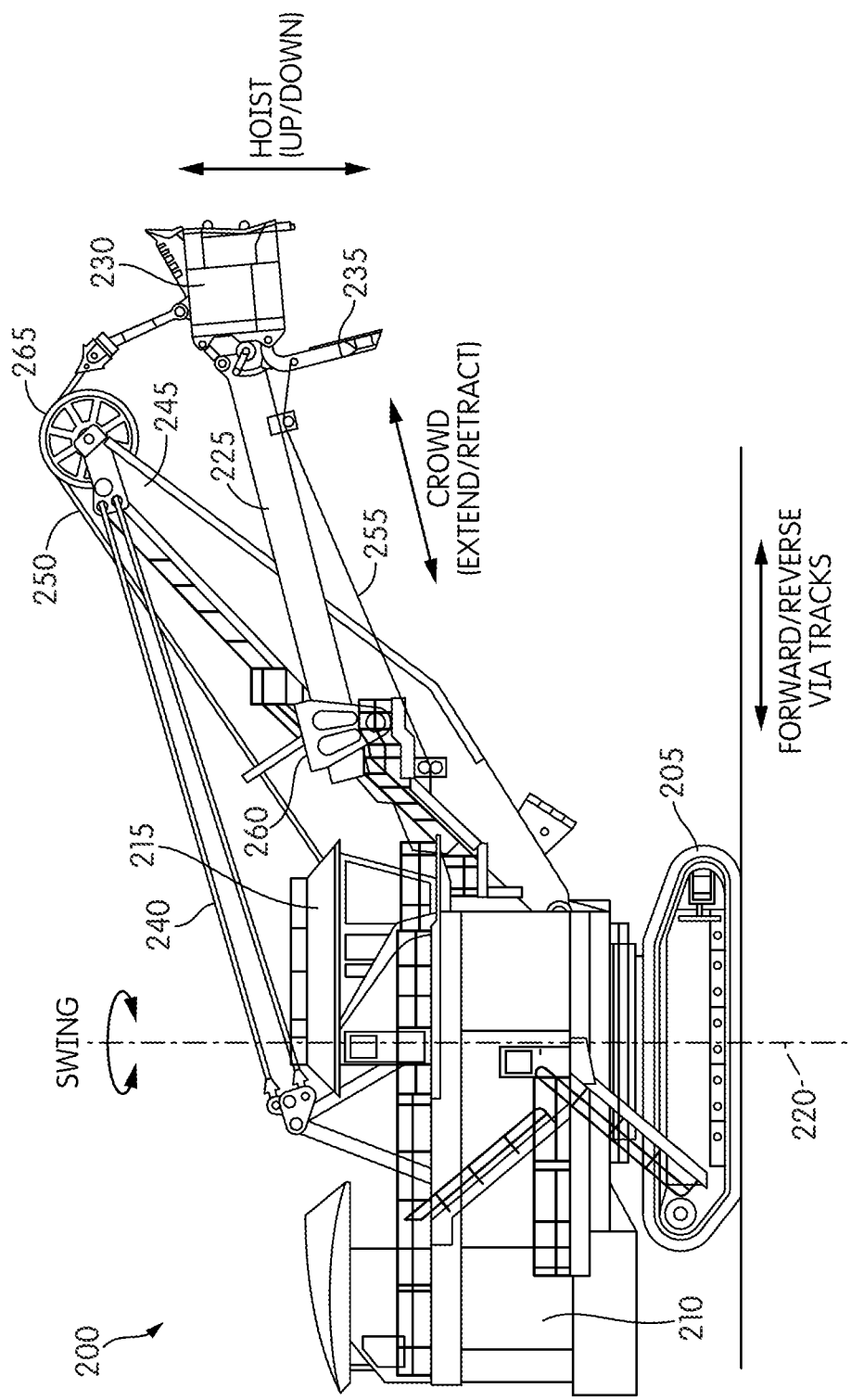
FIG. 2 illustrates an industrial machine according to one embodiment of the invention.

FIG. 2 illustrates an industrial machine 200 according to some embodiments of the invention. Although the invention described herein can be applied to, performed by, or used in conjunction with a variety of industrial machines (e.g., a rope shovel, a dragline, AC machines, DC machines, etc.), embodiments of the invention described herein are described with respect to an electric rope or power shovel, such as the industrial machine 200 illustrated in FIG. 2. In the illustrated embodiment, the industrial machine 200 includes tracks 205 for propelling the industrial machine 200 forward and backward, and for turning the industrial machine 200 (i.e., by varying the speed and/or direction of left and right tracks relative to each other). The tracks 205 may support a base 210 including a cab 215. The base 210 is able to swing or swivel about a swing axis 220, for instance, to move from a digging location to a dumping location. Movement of the tracks 205 is not necessary for the swing motion. The industrial machine 200 may further include a pivotable dipper handle 225 and dipper 230. The dipper 230 may include a door 235 for dumping the contents of the dipper 230.

In the illustrated embodiment, the industrial machine 200 further includes suspension cables 240 coupled between the base 210 and a boom 245 for supporting the boom 245. The industrial machine 200 may also include a wire rope or hoist cable 250 attached to a winch and hoist drum (not shown) within the base 210 for winding the hoist cable 250 to raise and lower the dipper 230, and a crowd cable 255 connected between another winch (not shown) and the dipper door 235. The industrial machine 200 may further include a saddle block 260 and a sheave 265.

Figure 3:
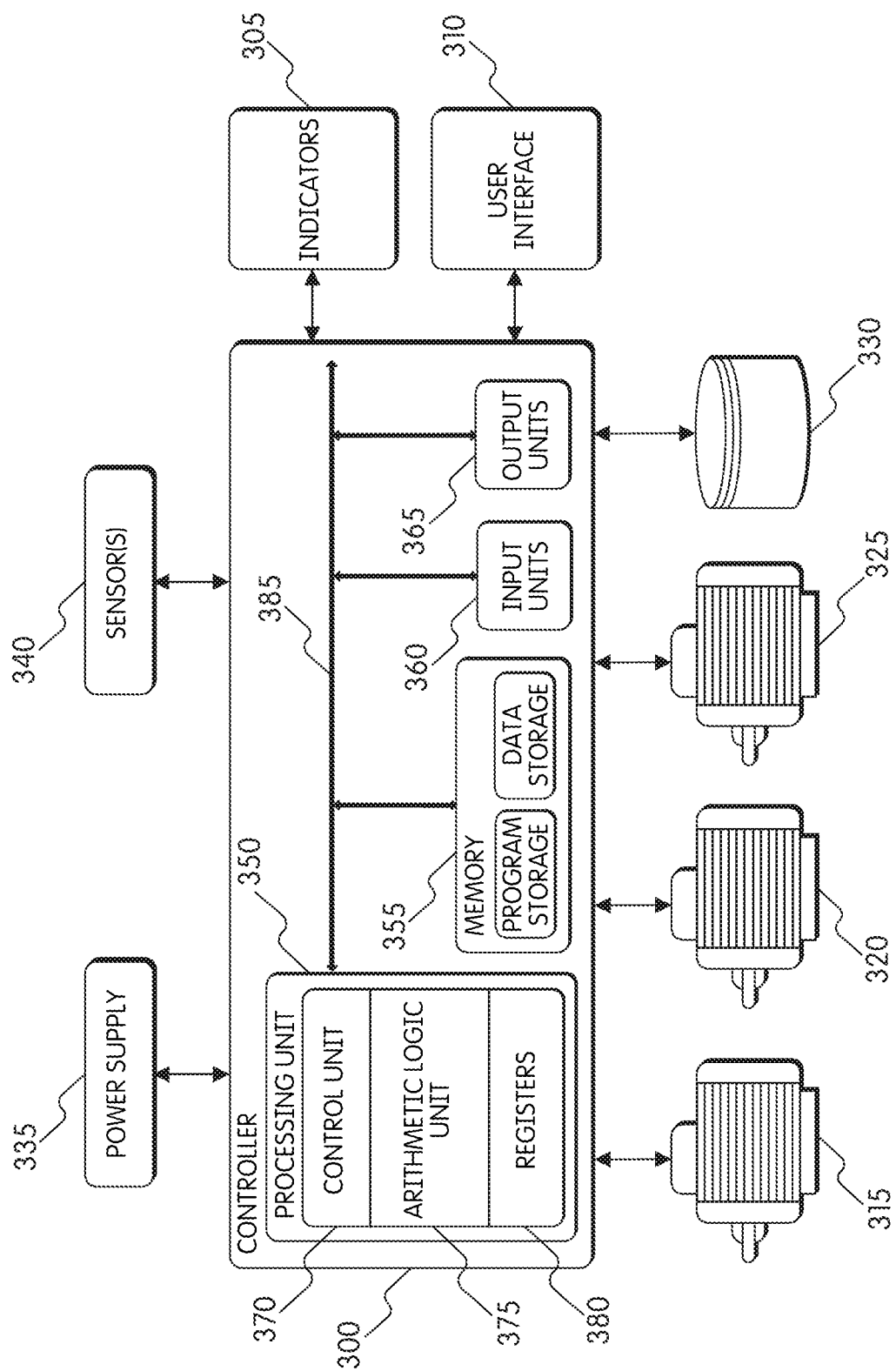
FIG. 3 illustrates a control system of the industrial machine of FIG. 2 according to one embodiment of the invention.

FIG. 3 illustrates a controller 300 associated with the industrial machine 200 of FIG. 2. The controller 300 is electrically and/or communicatively connected to a variety of modules or components of the industrial machine 200. For example, the illustrated controller 300 is connected to one or more indicators 305, a user interface module 310, one or more hoist actuation devices (e.g., motors, hydraulic cylinders, etc.) 215, one or more crowd actuation devices (e.g., motors, hydraulic cylinders, etc.) 320, one or more swing actuation devices (e.g., motors, hydraulic cylinders, etc.) 325, a data store or database 330, a power supply module 335, and one or more sensors 340. The controller 300 includes combinations of hardware and software that are operable to, among other things, control the operation of the industrial machine 200, control the position of the boom 245, the dipper handle 225, the dipper 230, etc., activate the one or more indicators 305 (e.g., a liquid crystal display ["LCD"]), monitor the operation of the industrial machine 200, etc. The one or more sensors 340 include, among other things, a voltmeter, one or more motor field modules (e.g., measuring motor parameters such as current, voltage, power, etc.), a loadpin, a strain gauge, one or more inclinometers, gantry pins, one or more rope tension sensors, one or more resolvers, etc.

In some embodiments, the controller 300 includes a plurality of electrical and electronic components that provide power, operational control, and protection to the components and modules within the controller 300 and/or industrial machine 200. For example, the controller 300 includes, among other things, a processing unit 350 (e.g., a microprocessor, a microcontroller, or another suitable programmable device), a memory 355, input units 360, and output units 365. The processing unit 350 includes, among other things, a control unit 370, an arithmetic logic unit ("ALU") 375, and a plurality of registers 380 (shown as a group of registers in FIG. 3), and is implemented using a known computer architecture, such as a modified Harvard architecture, a von Neumann architecture, etc. The processing unit 350, the memory 355, the input units 360, and the output units 365, as well as the various modules connected to the controller 300 are connected by one or more control and/or data buses (e.g., common bus 385). The control and/or data buses are shown generally in FIG. 3 for illustrative purposes. The use of one or more control and/or data buses for the interconnection between and communication among the various modules and components would be known to a person skilled in the art in view of the invention described herein. In some embodiments, the controller 300 is implemented partially or entirely on a semiconductor (e.g., a field-programmable gate array ["FPGA"] semiconductor) chip.

The memory 355 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 350 is connected to the memory 355 and executes software instructions that are capable of being stored in a RAM of the memory 355 (e.g., during execution), a ROM of the memory 355 (e.g., on a generally permanent basis), or another non-transitory computer readable medium such as another memory or a disc. Software included in the implementation of the industrial machine 200 can be stored in the memory 355 of the controller 300. The software includes, for example, firmware, one or more applications, program data, filters, rules, one or more program modules, and other executable instructions. The controller 300 is configured to retrieve from memory and execute, among other things, instructions related to the control processes and methods described herein. In other constructions, the controller 300 includes additional, fewer, or different components.

The controller 300 may further be electrically coupled to a power supply module 335. The power supply module 335 supplies a nominal AC or DC voltage to the controller 300 or other components or modules of the industrial machine 200. The power supply module 335 is powered by, for example, the power source 110 described in detail above with respect to FIG. 1A. The power supply module 335 is also configured to supply lower voltages to operate circuits and components within the controller 300 or industrial machine 200.

Other modules of the industrial machine 200 can include a network switch, a control cabinet, a hoist drive module, a crowd drive module, and a swing drive module (not shown). The hoist drive module, the crowd drive module, and the swing drive module are configured to receive control signals from, for example, the controller 300 to control hoisting, crowding, and swinging operations of the industrial machine 200. The control signals are associated with drive signals for hoist, crowd, and swing actuation devices 315, 320, and 325 (e.g., motors) of the industrial machine 200. As the drive signals are applied to the actuation devices 315, 320, and 325, the outputs (e.g., electrical and mechanical outputs) of the actuation devices are monitored and fed back to the controller 300. The outputs of the actuation devices 315, 320, and 325 include, for example, positions, speeds, torques, powers, currents, pressures, etc. Based on these and other signals associated with the industrial machine 200, the controller 300 is configured to determine or calculate one or more operational states or positions of the industrial machine 200 or its components.

The controller 300 is connected to various components for communication through, for example, a fiber-optic communication system utilizing one or more network protocols for industrial automation, such as process field bus ("PROFIBUS"), Ethernet, ControlNet, Foundation Fieldbus, INTERBUS, controller-area network ("CAN") bus, etc. A sensor (e.g., a voltmeter), one or of the motor field modules (e.g., measuring motor parameters such as current, voltage, power, etc.), a loadpin, a strain gauge, one or more inclinometers, gantry pins, one or more rope tension sensors, one or more resolvers, etc. can provide electrical signals to the controller 300.

Figure 4A:
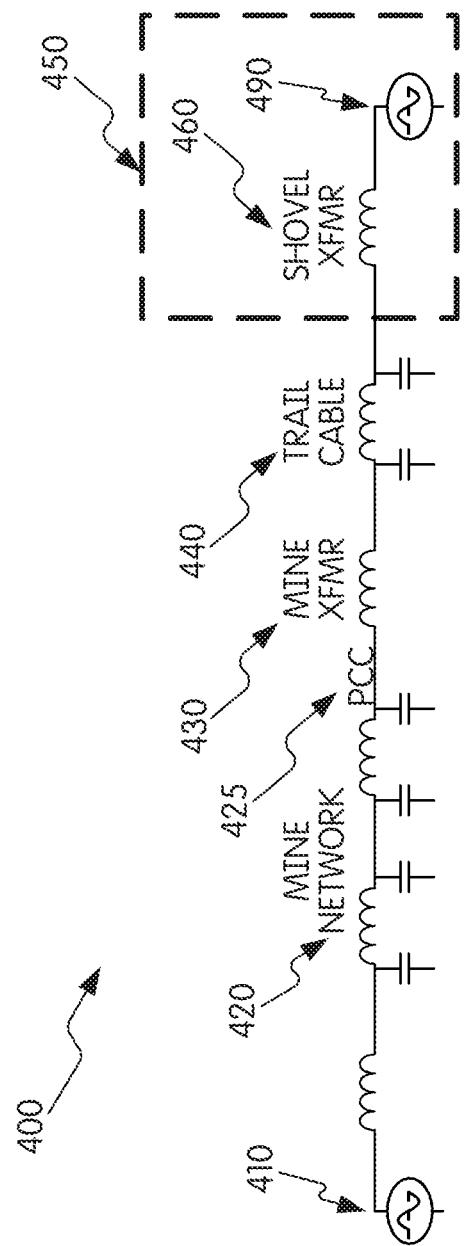
FIG. 4A is a single line diagram of a power supply system for a mine site according to one embodiment of the invention.

FIG. 4A illustrates a power supply system 400, according to one embodiment, used at a mine site for powering one or more industrial machines 200 that use a multi-pulse transformer 460. The power supply system 400 includes a power source 410 (e.g., a utility power source), a mine network 420, a mine transformer 430, a trail cable 440, and a power system 450 of at least one industrial machine 200. The power system 450 includes components located inside of the industrial machine 200, such as a multi-pulse transformer 460 and converters 490.

In some embodiments, the power source 410, mine network 420, mine transformer 430, and trail cable 440 are similar to the power source 110, the mine network 120, the mine transformer 130, and the trail cable 140 of the conventional power supply system 100 illustrated in FIG. 1A and described above. In some embodiments, the trail cable 440 may have a length of several kilometers and is configured to deliver power at a nominal line voltage between approximately 4000VAC and approximately 14000VAC having frequencies of approximately 50 Hz to approximately 60 Hz.

As discussed above with respect to the PCC 125 of the conventional power supply system 100, the Point of Common Coupling (PCC) 425 is the point in the power supply system 400 where multiple loads (i.e., multiple industrial machines 200) may be connected to the power source 410 and mine network 420. The multi-pulse transformer 460 reduces the amount of harmonic distortion at the PCC 425 through the phase shifting of the plurality of secondary windings with respect to the primary winding (described in further detail below with respect to FIGS. 4B and 5). Reducing harmonic distortions at the PCC 425 allows for a more efficient operation of the power supply system 400.

Figure 4B:
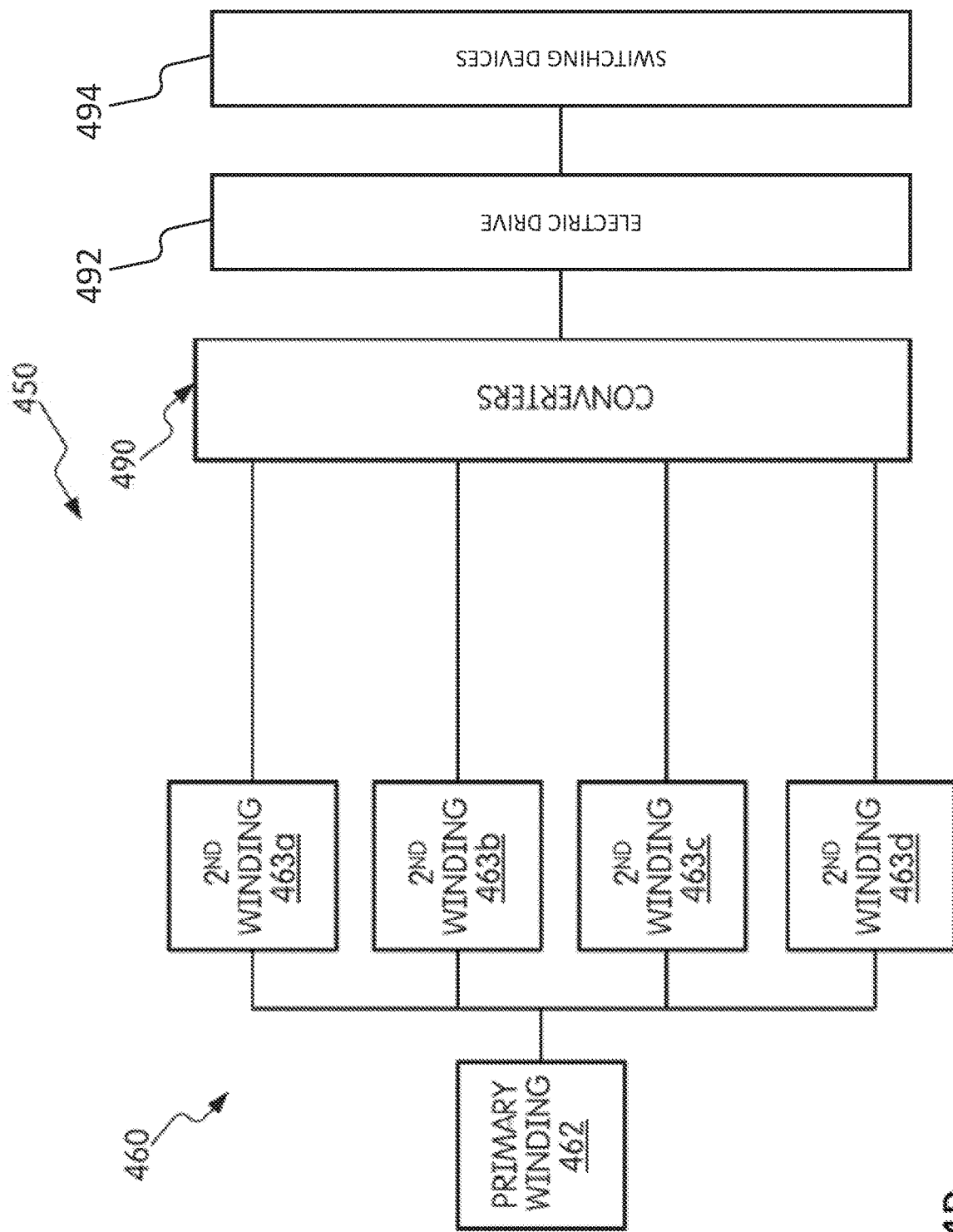
FIG. 4B illustrates a power system of the industrial machine of FIG. 2 according to one embodiment of the invention.

FIG. 4B illustrates the power system 450 of the industrial machine 200 in further detail. As illustrated, the power system 450 includes the multi-pulse transformer 460 and converters 490. The multi-pulse transformer 460 has a primary winding 462 and a plurality of secondary windings 463a, 463b, 463c, and 463d. The multi-pulse transformer 460 receives power from the trail cable 140 at the primary winding 462. Depending on a design configuration (e.g., connections, turn ratios, and core material), the multi-pulse transformer 460 is configured to efficiently modify or change AC voltage (e.g., a primary voltage) from a first-voltage level (e.g., a high voltage level, a medium voltage level, etc.) to a secondary voltage at a second-voltage level (e.g., a low voltage, etc.) within the industrial machine 200. The secondary voltage is then output from the plurality of secondary windings 463a, 463b, 463c, and 463d to the converters 490.

Figure 1B:
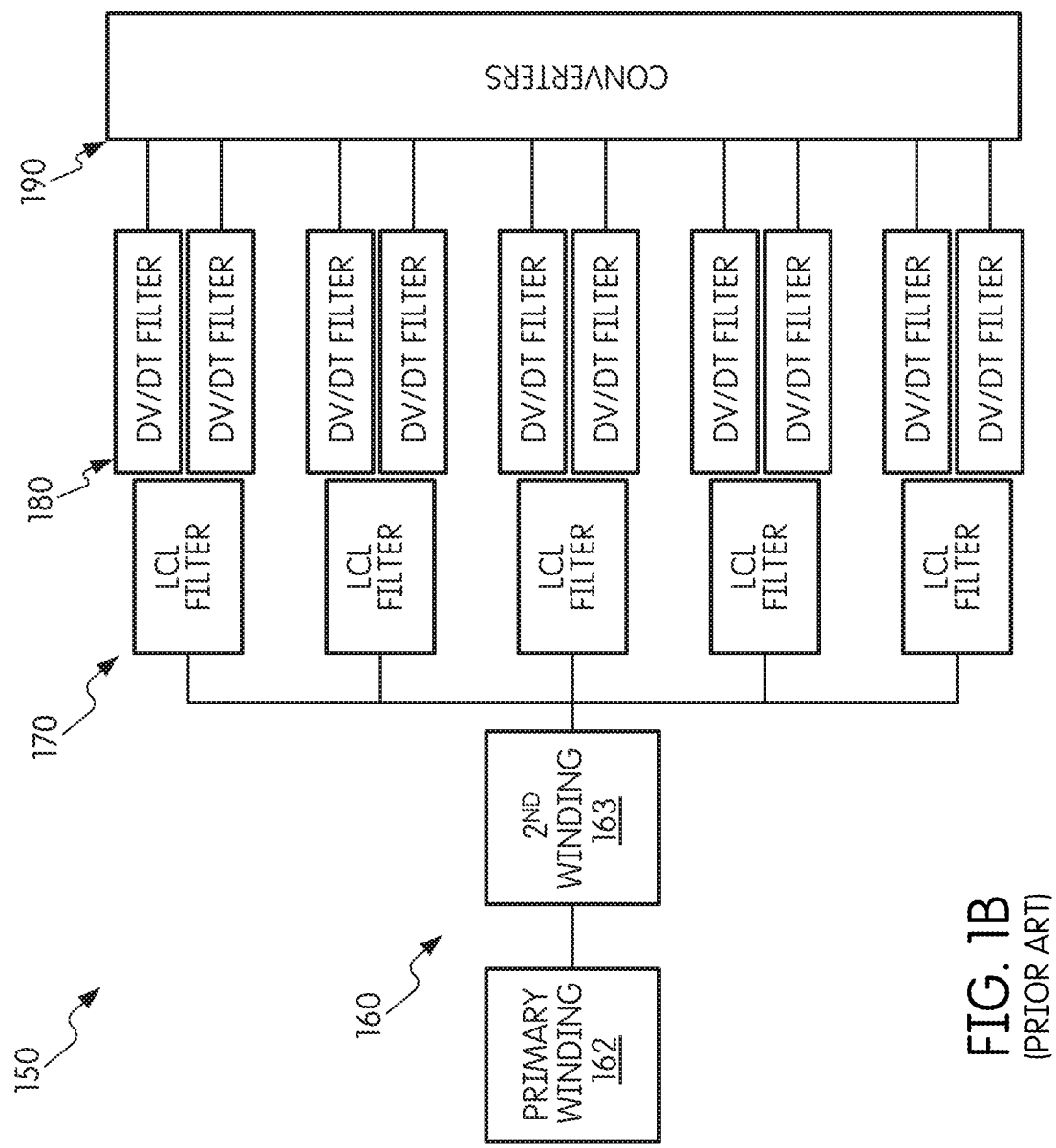
FIG. 1B illustrates a conventional power system for an industrial machine.

The multi-pulse transformer 460 reduces harmonics of the motor drive system of the industrial machine 200. Multi-pulse transformers are commonly connected to a passive diode rectifier system which does not allow for bi-directional flow of power. However, in the present embodiment, the multi-pulse transformer 460 may be configured to connect to the active front end (AFE) system of the industrial machine 200. Connecting the multi-pulse transformer 460 to the AFE system allows for bi-directional flow of power. Additionally, the multi-pulse transformer 460 differs from the conventional shovel transformer 160 (as illustrated in FIGS. 1A and 1B), for example, by including the plurality of secondary windings 463a, 463b, 463c, and 463d, whereas a conventional shovel transformer 160 typically includes a single secondary winding. In some embodiments, the multi-pulse transformer 460 has four or eight secondary windings, wherein there are six pulses per secondary winding of the multi-pulse transformer 460. However, in other embodiments, more or less secondary windings may be used. For example, a multi-pulse transformer 460 with four secondary windings can have twenty-four pulses (i.e., a 24-pulse transformer), and a multi-pulse transformer 460 with eight secondary windings can have forty-eight pulses (i.e., a 48-pulse transformer). The conventional shovel transformer 160 typically includes a single secondary winding and six pulses. As such, a multi-pulse transformer 460 includes more than one secondary winding and more than six pulses. In some embodiments, the secondary windings 463a-463d are approximately 460V secondary windings.

The converters 490 deliver power to a DC bus (not shown), which distributes the secondary voltage to one or more components (e.g., motors (such as but not limited to actuation devices 315, 320, and 325), electric drives, controllers, blowers, sensors, lights, etc.) of the industrial machine 200. In some embodiments, the converters 490 are insulated-gate bipolar transistor (IGBT) bridge converter operable to convert an AC voltage to a DC voltage. The components of the industrial machine 200 each require variable amounts of power during various times of operation. The non-linear loads of components (e.g. power switching devices 494 controlled by an electric drive 492) of the industrial machine 200 lead to harmonic distortion (e.g., the Total Harmonic Distortion [THD]).

The power system 450 uses the plurality of secondary windings 463a, 463b, 463c, and 463d of the multi-pulse transformer 460 in order to attenuate (i.e., reduce) the harmonic distortions and reduce the THD at the PCC 425. In some embodiments, line filters and voltage spike filters (such as line filters 170 and voltage spike filters 180 illustrated in FIG. 1A) are not necessary for the power system 450, thus reducing the size of the enclosure of the converters 490 and improving the efficiency (e.g., less power loss, less heat generated, etc.) of the power system 450. Additionally, by removing line filters and voltage spike filters, the industrial machine 200 may have increased tolerance to shock and vibrations as a result of the decreased number of components (e.g., line filters 170 and voltage spike filters 180) included in the power system 450. The multi-pulse transformer 460 is operable to both reduce harmonic distortions caused by the converters 490 and components of the industrial machine 200 and convert a primary voltage (received from the power source 110 through the trail cable 140) to a secondary voltage (provided to converters 490).

Figure 5:
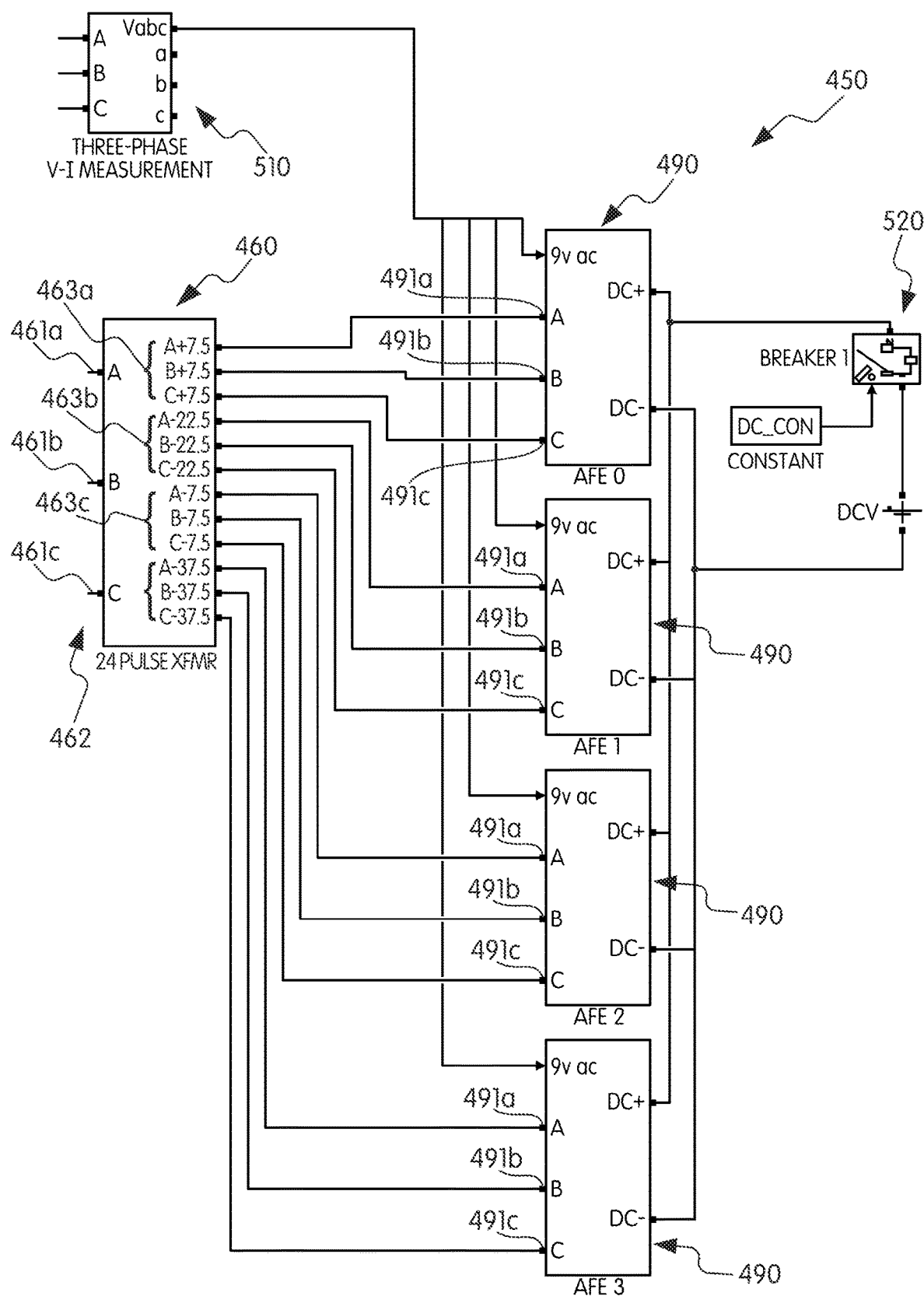
FIG. 5 is an electrical schematic diagram of the power system of FIG. 4B according to one embodiment of the invention.

FIG. 5 illustrates the power system 450 including detailed electrical connections between the multi-pulse transformer 460 and converters 490 according to some embodiments of the invention. Primary voltage is received from the trail cable 140 at three-phase input 461a, 461b, and 461c (one for each phase) of the primary winding 462 illustrated on the left side of the multi-pulse transformer 460. The plurality of secondary windings 463a, 463b, 463c, and 463d are illustrated on the right-side of the multi-pulse transformer 460. In the illustrated embodiment, there are four secondary windings, although in other embodiments, there may be more or less windings. Each of the secondary windings 463a, 463b, 463c, and 463d have three-phase connections (labeled as A#, B#, and C#) that are configured to deliver the secondary voltage to the converters 490.

Each of the secondary windings 463a, 463b, 463c, and 463d are phase shifted with respect to the primary winding 462. The three-phase connections for each secondary winding 463a, 463b, 463c, and 463d are phase shifted by the same amount. For example in the illustrated embodiment, in a multi-pulse transformer 460 with four secondary windings 463a, 463b, 463c, and 463d, the first secondary winding (e.g., 463a) may be phase shifted to lead the primary winding 462 by 7.5 degrees (labeled as A+7.5, B+7.5, and C+7.5 in FIG. 5), the second secondary winding (e.g., 463b) may be phase shifted to lag the primary winding 462 by 22.5 degrees (labeled as A-22.5, B-22.5, C-22.5), the third secondary winding (e.g., 463c) may be phase shifted to lag the primary winding 462 by 7.5 degrees (labeled as A-7.5, B-7.5, C-7.5), and the fourth secondary winding (e.g., 463d) may be phase shifted to lag the primary winding 462 by 37.5 degrees (labeled as A-37.5, B-37.5, C-37.5).

A multi-pulse transformer 460 with four secondary windings 463a, 463b, 463c, and 463d may be referred to as a 24-pulse transformer, which in some embodiments includes six pulses per secondary winding. Various numbers of secondary windings may be used. In some embodiments, there are six secondary windings in the multi-pulse transformer 460 (e.g., a 36-pulse transformer). In other embodiments, eight secondary windings (e.g., a 48-pulse transformer) may be used.

The phase shift of the secondary windings 463a, 463b, 463c, and 463d enables the multi-pulse transformer 460 to reduce harmonic distortions cause by the converters 490 and other components of the industrial machine 200. The phase shift of each of the plurality of secondary windings 463a, 463b, 463c, and 463d may be determined mathematically in order to attenuate or cancel harmonic distortions and thus reduce the Total Harmonic Distortion (THD). The adjustment and setting of phase shifts to attenuate harmonic distortions and reduce the THD would be known to a person skilled in the art in view of the invention described herein.

As discussed above, each of the plurality of secondary windings 463a, 463b, 463c, and 463d of the multi-pulse transformer 460 may be connected to the converters 490. The converters 490 (e.g., an IGBT bridge converter in the AFE system) each have three connections points 491a, 491b, 491c configured to receive the three phases of secondary voltage from the secondary windings 463a, 463b, 463c, and 463d. The converters 490 are electrically connected to at least one component 520 (e.g., a circuit breaker). In some embodiments, the converters 490 are also electrically connected to a sensor 510 (e.g., a three-phase voltage and current measurement tool). The sensor 510 may provide synchronization information back to the converters 490. The converters 490 may then control synchronization through the line (e.g., the power line from the power source 110 to the industrial machine 200).

The power system 450 of FIG. 5 illustrates four converters 490 connected to four secondary windings 463a, 463b, 463c, and 463d of the multi-pulse transformer 460. In other embodiments, different numbers of converters 490 may be used. For example, in some embodiments, a 48-pulse transformer with eight secondary windings may be connected to eight converters 490. The phase shift of each of the plurality of secondary windings may be changed depending on the number of secondary windings.

In some embodiments, multiple converters 490 are connected to a single secondary winding of the multi-pulse transformer 460. In such an embodiment, minimal line filters 170 and voltage spike filters 180 may be added to the power system 450 to reduce additional harmonic distortions caused by connecting multiple converters 490 to a single secondary winding. The multi-pulse transformer 460 still reduces harmonic distortions and is supplemented by the line filters 170 and the voltage spike filters 180.

Figure 6:
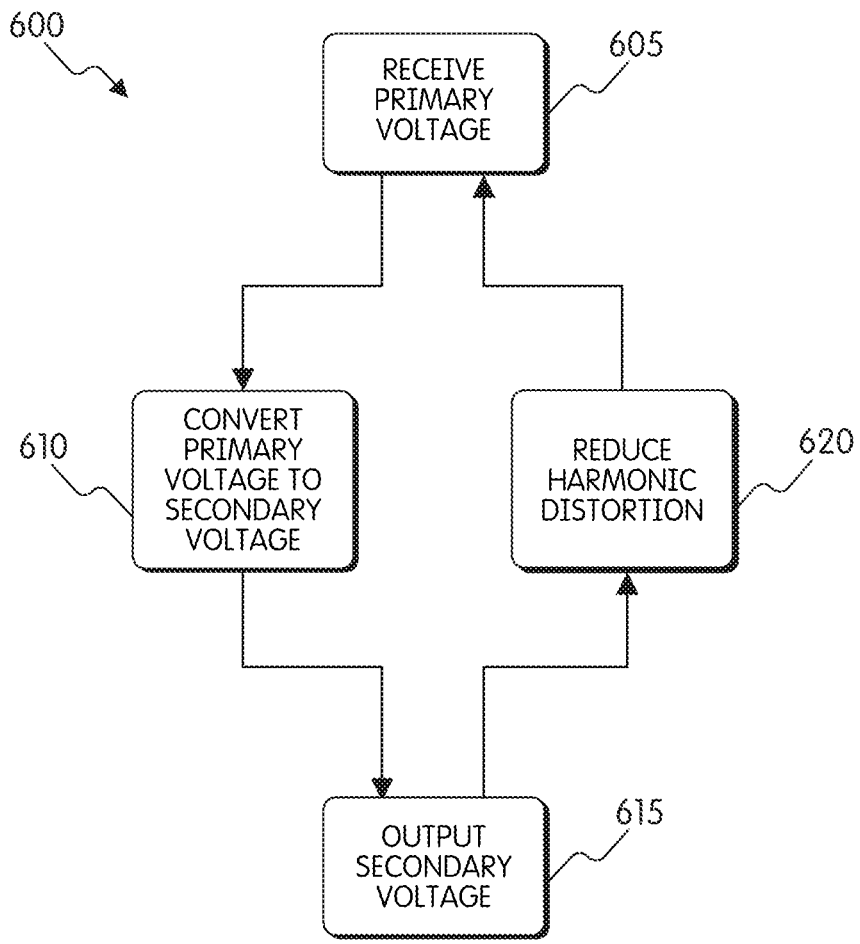
FIG. 6 is a process for delivering power to a component of the industrial machine of FIG. 2 according to one embodiment of the invention.

FIG. 6 illustrates a process, or operation, 600 is associated with and described herein with respect to delivering power to a component of the industrial machine 200 by the power system 450 during operation. Various steps described herein with respect to the process 600 are capable of being executed simultaneously, in parallel, or in an order that differs from the illustrated serial manner of execution. The process 600 may also be capable of being executed using fewer steps than are shown in the illustrated embodiment.

The multi-pulse transformer 460 receives a primary voltage (e.g., a first voltage) from the trail cable 140 at the primary winding 462 (step 605). The primary voltage is converted to a secondary voltage (e.g., a second voltage) by the multi-pulse transformer 460 (step 610). The secondary voltage is delivered from the plurality of secondary windings 463a, 463b, 463c, and 463d to the converters 490 (step 615). As described above, the converters 490 can further change or adjust the secondary voltage and further deliver the secondary voltage to various components (e.g., electric drives, controllers, blowers, sensors, lights, etc.) of the industrial machine 200.

At step 620, the multi-pulse transformer 460 attenuates (i.e., reduces) harmonic distortions caused by the non-linear loads of components (e.g. power switching devices controlled by an electric drive) of the industrial machine 200. As described above, the phase shift of the secondary windings 463a, 463b, 463c, and 463d enables the multi-pulse transformer 460 to attenuate harmonic distortions in order to reduce the THD at the PCC 425. The process 600 then loops back to step 605 to receive primary voltage.

Thus, the invention provides, among other things, a multi-pulse transformer for an industrial machine operable to convert a primary voltage to a secondary voltage and reduce harmonic distortions. The invention provides the benefit of increased tolerance to shock and vibrations. Additionally, the invention provides the benefit of a reduced number of components, leading to a reduction in weight and cost.

What is claimed is:

1. A multi-pulse transformer for an industrial machine, the multi-pulse transformer comprising:
   a primary winding configured to receive a first voltage from a power source, via a transformer; and
   a plurality of secondary windings each configured to output a phase-shifted alternating current (AC) voltage signal to a respective converter of a plurality of AC-to-direct current (DC) converters, each phase-shifted alternating current (AC) voltage signal being at a voltage less than the first voltage, wherein each converter includes an actively controlled transistor bridge;
   wherein the multi-pulse transformer attenuates harmonic distortions by phase shifting each one of the plurality of secondary windings with respect to the primary winding; and
   wherein the multi-pulse transformer provides bi-directional flow of power.

2. The multi-pulse transformer of claim 1, wherein the harmonic distortions are caused by at least one selected from the group consisting of the converter and a component.

3. The multi-pulse transformer of claim 2, wherein the component is a power switching device.

4. The multi-pulse transformer of claim 1, wherein the multi-pulse transformer is a twenty-four pulse transformer.

5. The multi-pulse transformer of claim 1, wherein the multi-pulse transformer is a thirty-six pulse transformer.

6. The multi-pulse transformer of claim 1, wherein the multi-pulse transformer is a forty-eight pulse transformer.

7. A power distribution system of an industrial machine, the power distribution system comprising:
- a plurality of converters, each of the plurality of converters including an actively controlled transistor bridge and operable to receive a phase-shifted alternating current (AC) voltage signal and to deliver a direct current (DC) voltage to a component of the industrial machine;
- a sensor configured to provide synchronization information to the plurality of converters; and a multi-pulse transformer providing bi-directional flow of power, the multi-pulse transformer having a primary winding and a plurality of secondary windings, each of the plurality of secondary windings phase shifted with respect to the primary winding, the multi-pulse transformer configured to receive a first voltage at the primary winding received from a transformer,
- convert, with the plurality of secondary windings, the first voltage to the phase-shifted AC voltage signals, the phase-shifted AC voltage signals being at a voltage less than the first voltage, provide the phase-shifted AC voltage signals to the plurality of converters, respectively, and attenuate harmonic distortions.

8. The power distribution system of claim 7, wherein the harmonic distortions are caused by at least one selected from the group consisting of the converter and the component.

9. The power distribution system of claim 7, wherein the component is a power switching device.

10. The power distribution system of claim 7, wherein the multi-pulse transformer is a twenty-four pulse transformer.

11. The power distribution system of claim 7, wherein the multi-pulse transformer is a thirty-six pulse transformer.

12. The power distribution system of claim 7, wherein the multi-pulse transformer is a forty-eight pulse transformer.

13. A method for delivering power to a component of an industrial machine, the method comprising:
- receiving, at a primary winding of multi-pulse transformer, a first voltage received from a transformer;
- converting, at the multi-pulse transformer, the first voltage to a plurality of phase-shifted alternating current (AC) voltage signals, the plurality of phase-shifted AC voltage signals being at a voltage less than the first voltage;
- outputting, at each secondary winding of a plurality of secondary windings of the multi-pulse transformer, at least one of the phase-shifted AC voltage signals to a respective converter of a plurality of AC-to-direct current (DC) converters, each phase-shifted AC voltage signal being at a voltage less than the first voltage, wherein each converter includes an actively controlled transistor bridge;
- attenuating, at the plurality of secondary windings, harmonic distortions; and
- providing, via the multi-pulse transformer, bi-directional flow of power.

14. The method of claim 13, wherein each of the plurality of secondary windings are phase shifted with respect to the primary winding.

15. The method of claim 13, wherein the harmonic distortions are caused by at least one selected from the group consisting of the converter and the component.

16. The method of claim 13, wherein the component is a power switching device.

17. The method of claim 13, wherein the multi-pulse transformer is a twenty-four pulse transformer.

18. The method of claim 13, wherein the multi-pulse transformer is a thirty-six pulse transformer.

19. The method of claim 13, wherein the multi-pulse transformer is a forty-eight pulse transformer.

20. The multi-pulse transformer of claim 1, wherein each converter includes a DC voltage output and the DC voltage outputs of the converters are coupled together by a common DC line.

* * * * *